US010738250B2

(12) United States Patent
Yoshida et al.

(10) Patent No.: US 10,738,250 B2
(45) Date of Patent: Aug. 11, 2020

(54) CARBON-CONTAINING MATERIAL GASIFICATION SYSTEM, AND METHOD FOR SETTING RATIO OF DISTRIBUTING OXIDIZING AGENT

(71) Applicant: Mitsubishi Hitachi Power Systems, Ltd., Yokohama-shi, Kanagawa (JP)

(72) Inventors: Shogo Yoshida, Yokohama (JP); Tetsuya Kizu, Yokohama (JP)

(73) Assignee: MITSUBISHI HITACHI POWER SYSTEMS, LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 16/083,184

(22) PCT Filed: Mar. 8, 2017

(86) PCT No.: PCT/JP2017/009240
§ 371 (c)(1),
(2) Date: Sep. 7, 2018

(87) PCT Pub. No.: WO2017/154982
PCT Pub. Date: Sep. 14, 2017

(65) Prior Publication Data
US 2019/0093030 A1    Mar. 28, 2019

(30) Foreign Application Priority Data
Mar. 11, 2016    (JP) .................................. 2016-048645

(51) Int. Cl.
*C10J 3/52*    (2006.01)
*C10J 3/72*    (2006.01)
*C10J 3/46*    (2006.01)

(52) U.S. Cl.
CPC .................. *C10J 3/526* (2013.01); *C10J 3/46* (2013.01); *C10J 3/72* (2013.01); *C10J 3/723* (2013.01);
(Continued)

(58) Field of Classification Search
CPC .......... C10J 2300/093; C10J 2300/1637; C10J 3/723
See application file for complete search history.

(56) References Cited

U.S. PATENT DOCUMENTS 3,782,913 A * 1/1974 Donath ..................... C07C 1/02
48/202
3,945,809 A * 3/1976 Donath ..................... C10J 3/00
48/73
(Continued)

FOREIGN PATENT DOCUMENTS

JP    2-149738 U    12/1990
JP    2008-150463 A    7/2008

OTHER PUBLICATIONS

Office Action dated Apr. 29, 2020, issued in counterpart CN Application No. 201780016620.6, with English Translation. (17 pages).

*Primary Examiner* — Matthew J Merkling
(74) *Attorney, Agent, or Firm* — Westerman, Hattori, Daniels & Adrian, LLP (57) ABSTRACT

A carbon-containing material gasification system includes: a gasifier that includes a combustion stage and a gasification stage, and generates generated gas; char providing means that separates char from the generated gas, and provides the combustion stage with the char, the combustion stage including carbon-containing material combustion means and char combustion means; and distributing ratio setting means that sets, according to a ratio of distributing material defined in Expression [1], a ratio of distributing oxidizing agent (Continued)

defined in Expression [2] to be smaller as the ratio of distributing material increases.

(ratio of distributing material)=(providing amount of the carbon-containing material for gasification stage)/(total providing amount of the carbon-containing material to gasifier) [1]

(ratio of distributing oxidizing agent)=(providing amount of the oxidizing agent to oxidize carbon-containing material for the combustion stage)/(total providing amount of the oxidizing agent to the combustion stage) [2]

4 Claims, 4 Drawing Sheets

(52) U.S. Cl.
CPC .............. *C10J 2300/0906* (2013.01); *C10J 2300/1628* (2013.01); *C10J 2300/1637* (2013.01); *C10J 2300/1846* (2013.01); *Y02E 20/18* (2013.01)

(56) References Cited

U.S. PATENT DOCUMENTS

| | | | | |
|---|---|---|---|---|
| 4,158,552 | A * | 6/1979 | Blaskowski | C10J 3/08 48/203 |
| 4,168,956 | A * | 9/1979 | Blaskowski | C10J 3/466 48/210 |
| 4,278,445 | A * | 7/1981 | Stickler | C10J 3/466 252/373 |
| 4,319,888 | A * | 3/1982 | Blaskowski | C10J 3/485 366/341 |
| 4,343,627 | A * | 8/1982 | Tanca | C10J 3/54 48/202 |
| 4,872,886 | A * | 10/1989 | Henley | C10J 3/485 48/197 R |
| 5,578,092 | A * | 11/1996 | Collin | C10J 3/54 44/620 |
| 8,202,330 | B2 * | 6/2012 | Kangasoja | C10J 3/26 423/644 |
| 8,211,191 | B2 * | 7/2012 | Douglas | C10J 3/487 48/61 |
| 8,414,668 | B2 * | 4/2013 | Yokohama | C10J 3/466 48/197 R |
| 10,093,876 | B2 * | 10/2018 | Williams | C10J 3/506 |

* cited by examiner

CARBON-CONTAINING MATERIAL GASIFICATION SYSTEM, AND METHOD FOR SETTING RATIO OF DISTRIBUTING OXIDIZING AGENT

TECHNICAL FIELD

The present invention relates to a carbon-containing material gasification system that provides an oxidizing agent to carbon-containing material for gasification and a method for setting a ratio of distributing oxidizing agent in the system.

BACKGROUND TECHNIQUE

A gasification plant with a gasifier that gasifies carbon-containing material has conventionally been known. An example of such a gasification plant is an Integrated coal Gasification Combined Cycle system (hereinafter referred to as an "IGCC system"). In an IGCC system, a gasifier gasifies pulverized coal (carbon-containing material) and thereby generates a fuel for a gas turbine.

One of the known types of gasifier is a two-stage entrained flow gasifier composed of a combustor (combustion stage) and a redactor (gasification stage).

A combustor is a part that blows an oxidizing agent and carbon-containing material into an inside of the gasifier from a combustor burner for carbon-containing material, also blows an oxidizing agent and char separated and recollected from gas generated in the gasifier from a combustor burner for char, and combusts the carbon-containing material and the char (including partial combustion) to generate high-temperature gas.

A redactor is a part that blows carbon-containing material into the inside of the gasifier from a redactor burner and thermally decomposes and gasifies the carbon-containing material using the high-temperature gas generated in the combustor.

A technique related to such a two-stage entrained flow gasifier is one disclosed in Patent Literature 1. Hereinafter, description will now be made in relation to the technique disclosed in Patent Literature 1. In the following description, reference numbers used in Patent Literature 1 are represented in the brackets for the reference.

The technique disclosed in Patent Literature 1 (see claim 4, for example) changes a ratio (R/T) of distributing pulverized coal to the gasification stage with the property of the pulverized coal so that various threshold conditions required for stable operation of the gasifier can be satisfied. A "ratio (R/T) of distributing pulverized coal" is a ratio of a providing amount (R) of pulverized coal to the gasification stage to a total providing amount (T) of pulverized coal of a providing amount (C) of pulverized coal to the combustion stage and the providing amount (R) of pulverized coal to the gasification stage.

PRIOR ART REFERENCE

Patent Literature

[Patent Literature 1] Japanese Laid-open Patent Publication No. 2008-150463

SUMMARY OF INVENTION

Problems to be Solved by Invention

Since the types and producing area of coal which has been used in a gasifier plant such as an IGCC system have been limited, the properties of the coal have fallen within narrow ranges. However, in accordance with widespread of gasifier plants in future, various types of coal are expected to be used, which also expects enlargement of the range of the property of coal to be used.

Likewise, in relation to a gasifier plant using biomass material, biomass material is expected to be diversified in type and consequently widen the range of the material property. For the above, a gasifier is required to be compatible with wider range of material property (coal property) than a conventional range.

Further examination is required in order to achieve the technique disclosed in Patent Literature 1 using a wide range of material property (coal property) because the widening the range of material property (coal property) accompanies an enlargement of change of a ratio of distributing pulverized coal.

With the foregoing problems in view, one of the object of the present invention is to provide a carbon-containing material gasification system and a method for setting a ratio of distributing oxidizing agent in the system that can enlarge the range of applicable carbon-containing fuel.

Means to Solve the Problem (1) To attain the above object, the carbon-containing material gasification system of the present invention is characterized by including: a gasifier including a combustion stage and a gasification stage, char providing means, a material distributing ratio adjusting valve, an oxidizing-agent distributing ratio adjusting valve, and a controlling apparatus.

Here, the gasifier generates high-temperature gas from the combustion stage by providing an inside of an inside of the gasifier with an oxidizing agent, a char, and a carbon-containing material for the combustion stage, and causes the high-temperature gas to thermal decompose and gasify a carbon-containing material for the gasification stage to generate generated gas from the gasification stage by providing the inside of the gasifier with the carbon-containing material for the gasification stage. The combustion stage includes carbon-containing material combustion means and char combustion means, provides the carbon-containing material for combustion stage along with an oxidizing agent for the carbon-containing material for the combustion stage from the carbon-containing material combustion means, and provides the char along with an oxidizing agent for the char from the char combustion means.

The char providing means that separates the char from the generated gas, and provides the combustion stage with the char.

The material distributing ratio adjusting valve adjusts a ratio of distributing material defined by an Expression [1].

The oxidizing-agent distributing ratio adjusting valve adjusts a ratio of distributing oxidizing agent defined by an Expression [2].

The controlling apparatus controls a degree of opening of the material distributing ratio adjusting valve and a degree of opening of the oxidizing-agent distributing ratio adjusting valve; and the controlling apparatus includes oxidizing-agent distributing ratio setting means that sets the ratio of distributing oxidizing agent to be smaller as the ratio of distributing material increases.

(ratio of distributing material)=(providing amount of the carbon-containing material for the gasification stage)/(total providing amount of the carbon-containing material to the gasifier)     [1]

(ratio of distributing oxidizing agent)=(providing
amount of the oxidizing agent to oxidize the
carbon-containing material for the combustion
stage)/(total providing amount of the oxidizing
agent to the combustion stage) [2]

(2) The carbon-containing material gasification system may further include material property inputting means that inputs a material property of the carbon-containing material into the controlling apparatus, and the controlling apparatus may further include material distributing ratio setting means that sets the ratio of distributing material in accordance with the material property.

(3) The carbon-containing material gasification system may preferably further include inert gas providing means that is capable of providing an inert gas to a material oxidizing-agent providing line that provides the oxidizing agent for the carbon-containing material for the combustion stage to the carbon-containing material combustion means, and the controlling apparatus may preferably include inert-gas providing controlling means that controls, when a providing amount of the oxidizing agent for the carbon-containing material for the combustion stage is equal to or less than a first threshold, operation of the inert gas providing means to provide the material oxidizing-agent providing line with the inert gas.

(4) The carbon-containing material gasification system may preferably further include inert gas providing means that is capable of providing an inert gas to a char oxidizing-agent providing line that provides the oxidizing agent for the char to the char combustion means, and the controlling apparatus may preferably include inert-gas providing controlling means that controls, when a providing amount of the oxidizing agent for the char is equal to or less than a second threshold, operation of the inert gas providing means to provide the char oxidizing-agent providing line with the inert gas.

(5) When an ash content of the carbon-containing material exceeds a predetermined content, the inert-gas providing controlling means may preferably control the operation of the inert gas providing means such that a providing amount of the inert gas to the carbon-containing material combustion means decreases further than a case where the ash content is equal to or lower than the predetermined content and such that the inert gas is provided to the char combustion means.

(6) The controlling apparatus may further include ash content inputting means that inputs the ash content into the controlling apparatus.

(7) The carbon-containing material gasification system may preferably further include cutoff means that stops providing of the oxidizing agent for the char to the char combustion means, the controlling apparatus may preferably further include oxidizing-agent cutoff controlling means that controls operation of the cutoff means, and the oxidizing-agent cutoff controlling means may preferably control, when information indicating that the ash content exceeds the predetermined content is input, operation of the cutoff means to stop the providing of the oxidizing agent to the char combustion means.

(8) To attain the above object, the method for setting a ratio of distributing oxidizing agent of the present invention sets a ratio of distributing an oxidizing agent in a carbon-containing material gasification system comprising: a gasifier that comprises a combustion stage and a gasification stage, and a char providing means, the method being characterized by including a material distributing ratio setting step and an oxidizing agent distributing ratio setting step.

Here, the gasifier generates high-temperature gas from the combustion stage by providing an inside of the gasifier with an oxidizing agent, a char, and a carbon-containing material for the combustion stage; and causes the high-temperature gas to thermal decompose and gasify a carbon-containing material for the gasification stage to generate generated gas from the gasification state by providing the inside of the gasifier with the carbon-containing material for the gasification stage. The combustion stage includes carbon-containing material combustion means and char combustion means, provides the carbon-containing material for combustion stage along with an oxidizing agent for the carbon-containing material for the combustion stage from the carbon-containing material combustion means, and provides the char along with an oxidizing agent for the char from the char combustion means.

The material distributing ratio setting step sets a ratio of distributing material defined by an Expression [3].

The oxidizing agent distributing ratio setting step sets the ratio of distributing oxidizing agent defined by an Expression [4] to be smaller as the ratio of distributing material increases.

(ratio of distributing material)=(providing amount of
the carbon-containing material for the gasification stage)/(total providing amount of the carbon-containing material to the gasifier) [3]

(ratio of distributing the oxidizing agent)=(providing
amount of the oxidizing agent to oxidize the
carbon-containing material for the combustion
stage)/(total providing amount of the oxidizing
agent to the combustion stage) [4]

(9) The method may preferably further include a first inert gas providing step for providing, when a providing amount of the oxidizing agent for the carbon-containing material for the combustion stage is equal to or less than a first threshold, an inert gas to a material oxidizing-agent providing line that provides the oxidizing agent for the carbon-containing material for the combustion stage to the carbon-containing material combustion means.

(10) The method may preferably further include a second inert gas providing step for providing, when a providing amount of oxidizing agent for the char is equal to or less than a second threshold, an inert gas to a char oxidizing-agent providing line that provides the oxidizing agent for the char to the char combustion means.

(11) The method may preferably further include, when an ash content of the carbon-containing material exceeds a predetermined content, decreasing a providing amount of the inert gas to the carbon-containing material combustion means further than a case where the ash content is equal to or lower than the predetermined content; and providing the inert gas to the char combustion means.

(12) The method may preferably further include, when the ash content exceeds the predetermined content, stopping the providing of the oxidizing agent to the char combustion means.

Effects of Invention

The present invention sets the ratio of distributing oxidizing agent for the carbon-containing material for the combustion stage in accordance with the ratio of distributing material to the gasification stage, and consequently sets a providing amount of oxidizing agent to oxidize the carbon-containing material in the combustion stage. Accordingly, the air ratio of the carbon-containing material combustion means can be set such that the blaze of the carbon-containing material combustion means is stably maintained regardless of the fuel property of the carbon-containing material combustion means.

Consequently, the range of the kind of carbon-containing material can be enlarged.

BRIEF DESCRIPTION OF DRAWINGS

FIGS. 2A and 2B are schematic diagrams showing setting maps of the first embodiment; FIG. 2A showing a map for setting a ratio Rc of distributing pulverized coal in accordance with a fuel ratio F; and FIG. 2B showing a map for setting a ratio Ro of distributing oxidizing agent in accordance with a ratio Rc of distributing pulverized coal;

EMBODIMENTS TO CARRY OUT INVENTION

Hereinafter, description will now be made in relation to embodiments of the present invention by referring to the accompanying drawings.

The present embodiments assume that the carbon-containing material gasification system is applied to a coal gasification system of an integrated coal gasification combined cycle system.

The following embodiments are merely exemplary, and have no intention to exclude various modifications and applications of techniques not explicitly described therein. The respective structure of the following embodiments can be variously modified without departing from the scope of the invention, and may be selected, omitted, combined according to the requirement.

In the following description, the term "providing amount" means a providing weight per unit time unless otherwise described.

1. First Embodiment

Description will now be made in relation to the configuration of a coal gasification system 100 according to the first embodiment with reference to FIGS. 1, 2A, and 2B.
[1-1. Entire Configuration of Coal Gasification System]

Figure 1:
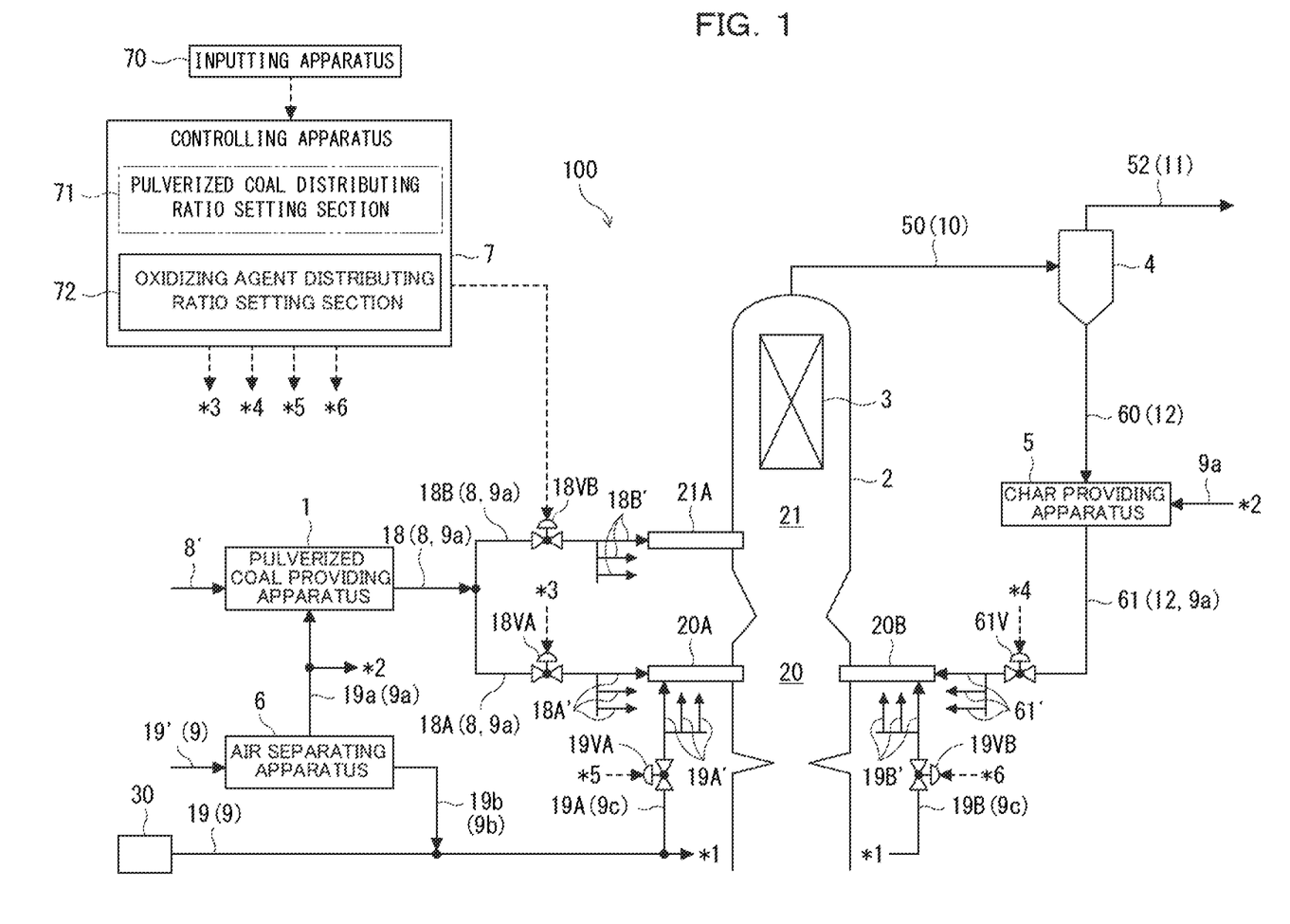
FIG. 1 is a schematic diagram illustrating the configuration of a coal gasification system (carbon-containing material gasification system) according to a first embodiment of the present invention.

The coal gasification system (carbon-containing material gasification system) 100 according to the first embodiment shown in FIG. 1 is installed in an Integrated coal Gasification Combined Cycle system (hereinafter referred to as an "IGCC system".

The coal gasification system 100 adopts an air combustion scheme that generates generated gas using air as an oxidizing agent, and the generated gas after being cleaned by a gas clean-up apparatus is provided to a gas turbine as a fuel of the gas turbine (the gas clean-up apparatus and a gas turbine do not appear in the drawings). The IGCC system in which the coal gasification system 100 is installed is an integrated coal gasification combined cycle system of an air combustion scheme (air-blown scheme).

Specifically, the coal gasification system 100 includes, as shown in FIG. 1, a pulverized coal providing apparatus 1, a gasifier 2, a gas cooler 3, a cyclone 4, a char providing apparatus 5, an air separating apparatus 6, a controlling apparatus 7, and an inputting apparatus (inputting means) 70.

The pulverized coal providing apparatus 1 generates pulverized coal (carbon-containing material) 8 by drying and pulverizing coal 8'. To the pulverized coal providing apparatus 1, an inert gas (the present invention uses nitrogen, hereinafter also referred to "nitrogen") 9a, serving as the carrier gas, is provided from the air separating apparatus 6 that is to be detailed below through an inert gas providing pipe 19a. The pulverized coal 8 generated by the pulverized coal providing apparatus 1 is carried into the gasifier 2 by the inert gas 9a through a pulverized coal providing pipe 18 and pulverized coal providing pipes 18A and 18B branched from the pulverized coal providing pipe 18.

To the gasifier 2, pulverized coal 8 and char 12 that is to be detailed below are provided as material for the generated gas (material for a gas turbine). The gasifier 2 generates generated gas 10 by gasifying the pulverized coal 8 and the char 12 using oxygen-rich air (hereinafter referred to as an "oxidizing agent") 9c provided through, for example, an oxidizing agent providing pipe 19 as an oxidizing agent.

The oxygen-rich air 9c is generated by mixing compressed air 9 provided from a gas turbine unit 30 and oxygen 9b provided from the air separating apparatus 6. Namely, the oxygen-rich air 9c is generated by providing the air separating apparatus 6 with the compressed air 9 through an oxidizing agent providing pipe 19' and also providing the oxidizing agent providing pipe 19 with the oxygen 9b separated from the compressed air 9 through the oxygen providing pipe 19b. The oxidizing agent 9c is provided into the gasifier 2 through the oxidizing agent providing pipe 19 and the oxidizing agent providing pipes 19A and 19B branched from the oxidizing agent providing pipe 19.

The air separating apparatus 6 separates the compressed air 9 into oxygen 9b and nitrogen 9a. The nitrogen 9a is used as the carrier gas for the pulverized coal 8 as described above, and is also used as a carrier gas for the char 12 as will be described below.

The gas turbine unit 30 includes a gas turbine, a compressor that provides the compressed air 9 to the oxidizing agent providing pipes 19 and 19', and a generator as will be detailed below (the gas turbine, the compressor, and the generator do not appear in the drawings).

The generated gas 10 generated by the gasifier 2 is cooled by the gas cooler 3, which is a heat exchanger installed in the gasifier 2, and is then provided to the cyclone 4 from the upper portion of the gasifier 2 through a gas duct 50. The generated gas 10 contains char 12 containing, as main components, unburned carbon and ash, and the cyclone 4 separates the char 12 from the generated gas 10. The char 12 separated from the generated gas 10 falls from the cyclone 4 by gravity, and is collected by the char providing apparatus 5 consisting of a char bin and a hopper through a char pipe 60. To the char providing apparatus 5, inert gas 9a serving as a carrier gas, is provided from the air separating apparatus 6 through the inert gas providing pipe 19a. The char 12 collected in the char providing apparatus 5 is returned to the gasifier 2 through a char providing pipe 61 by the inert gas 9a.

With this configuration, the cyclone 4 and the char providing apparatus 5 are configured to be the char providing means of the present invention.

The char 12 returned to the gasifier 2 is used as a material for the generated gas 10 in conjunction with the pulverized coal 8.

The generated gas 10 is separated into the char 12 and generated gas 11 with the cyclone 4. The generated gas 11 from which the char 12 has been separated with cyclone 4 is provided to a downstream facility (not shown) consisting of the IGCC system through a gas duct 52.

The generated gas 11 is cleaned by the downstream facility, and is provided to the gas turbine unit 30. The generated gas 11 is used as a fuel in the combustor of the gas turbine, and burns using compressed air provided from the compressor driven by the gas turbine as the combustion air. This generates combustion gas, which drives the gas turbine and the generator coupled to the gas turbine. Consequently, electric power is generated.

The exhaust gas exhausted from the gas turbine is provided to a heat recovery steam generator (hereinafter also referred to as a "HRSG"), used as the heat source to generates steam (including reheat steam), and then exhausted to the atmosphere. The steam generated by the HRSG is provided to a steam turbine. The steam turbine is coaxially coupled to the gas turbine and the generator, and drives the generator coupled to the gas turbine in conjunction with the gas turbine to generate electric power.

As described above, the compressor provides the compressed air 9 to the oxidizing agent providing pipes 19 and 19'.

The controlling apparatus 7 variously controls the coal gasification system 100. Into the controlling apparatus 7, various pieces of information such as the properties of coal 8' are input from the inputting apparatus 70.

[1-2. Principal Configuration of the Coal Gasification System]

As shown in FIG. 1, the gasifier 2 is configured to be a two-stage entrained flow gasifier including a combustor (combustion stage) 20 and a redactor (gasification stage) 21. The combustor 20 generates high-temperature gas by combusting (including partially combusting) the pulverized coal 8 and the char 12, and also melts ash contained in the pulverized coal 8 and the char 12. The redactor 21 heats the pulverized coal 8 with the high-temperature gas generated by the combustor 20 to thermal decompose and gasify the pulverized coal 8 and consequently generates the generated gas 10. The ash melted in the combustor 20 is ejected, as slag, from a slag hole formed at the lower part of the gasifier 2.

Hereinafter, further description will now be made in relation to the combustor 20 and the redactor 21.

The combustor 20 is provided with combustor burners 20A for pulverized coal (hereinafter, also referred to as "pulverized-coal combustor burners" and "burners") and a combustor burners 20B for char (hereinafter, also referred to as "char burners" and "burners") 20B.

A predetermined number (hereinafter, also referred to as "burner number") Nc of pulverized-coal combustor burners 20A are provided along the circumference direction of the gasifier 2. Likewise, a predetermined number (hereinafter, also referred to as "burner number") Nch of char burners 20B are provided along the circumference direction of the gasifier 2.

This means that the carbon-containing material combustion means of the present invention includes a predetermined number Nc of pulverized-coal combustor burners 20A, and the char combustion means of the present invention includes a predetermined number Nch of char burners 20B.

To each pulverized-coal combustor burner 20A, a pulverized coal distributing pipe 18A' is individually coupled. Each pulverized coal distributing pipe 18A' is branched, for each of the pulverized-coal combustor burners 20A, from pulverized coal providing pipe 18A for the combustor 20 branched from the pulverized coal providing pipe 18. To each of the pulverized-coal combustor burners 20A, an oxidizing agent distributing pipe (material oxidizing-agent providing line) 19A' is coupled. Each oxidizing agent distributing pipe 19A' is individually branched, for each of the pulverized-coal combustor burners 20A, from the oxidizing agent providing pipes 19A for the pulverized-coal combustor burners 20A branched from the oxidizing agent providing pipe 19.

With this configuration, the pulverized coal 8 (containing inert gas 9a serving as the carrier gas) is provided from the pulverized coal distributing pipe 18A' to each individual pulverized-coal combustor burner 20A, and the oxidizing agent 9c is provided from oxidizing agent distributing pipe 19A' to each individual pulverized-coal combustor burner 20A.

To each individual char burner 20B, a char distributing pipe 61' is individually coupled. A char distributing pipe 61' is branched from the char providing pipe 61 for each char burners 20B. Further, an oxidizing-agent distributing pipe (char oxidizing-agent providing line) 19B' is individually coupled to each char burner 20B. The oxidizing-agent distributing pipe 19B' is branched from the oxidizing agent providing pipe 19B for each char burner 20B which pipe is branched from the oxidizing agent providing pipe 19, for each char burner 20B.

Thereby, to each individual char burner 20B, the char 12 (containing the inert gas 9a serving as the carrier gas) is provided from the char distributing pipe 61' and the oxidizing agent 9c is individually provided from the oxidizing agent distributing pipe 19B'.

The redactor 21 is provided with a predetermined number (hereinafter referred to as "burner number") Nr of redactor burners 21A for pulverized coal (hereinafter, also referred to as a "redactor pulverized-coal burners" and "burners"). To each redactor pulverized-coal burner 21A, a pulverized coal distributing pipe 18B' is coupled and consequently, the pulverized coal 8 (containing the inert gas 9a serving as the carrier gas) is provided from the pulverized coal distributing pipe 18B'. Each pulverized coal distributing pipe 18B', for one of the redactor pulverized-coal burner 21A, is branched from the pulverized coal providing pipe 18B for the redactor 21 branched from the pulverized coal providing pipe 18.

A flow adjusting valve 18VA is interposed in the pulverized coal providing pipe 18A and a flow adjusting valve 18VB is interposed in the pulverized coal providing pipe 18B. A flow adjusting valve 61V is interposed in the char providing pipe 61. A flow adjusting valve 19VA is interposed in the oxidizing agent providing pipe 19A, and a flow adjusting valve 19VB is interposed in the oxidizing agent providing pipe 19B.

Controlling the respective degrees of opening of the flow adjusting valves 18VA, 18VB, 61V, 19VA, and 19VB can control providing amounts of the pulverized coal 8, the char 12, and the oxidizing agent 9c to the burners 20A, 20B, and 21A.

The respective degrees of opening of the flow adjusting valves 18VA, 18VB, 61V, 19VA, and 19VB are controlled by the controlling apparatus 7.

A ratio Rc of distributing pulverized coal (material distributing ratio) is input into the controlling apparatus 7 from the inputting apparatus 70 or is stored in the controlling apparatus 7 in advance. The controlling apparatus 7 controls the degrees of opening of the flow adjusting valves 18VA and 18VB to achieve the ratio Rc of distributing pulverized coal. Namely, the flow adjusting valves 18VA and 18VB are configured to be a material distributing ratio adjusting valve of the present invention.

The ratio Rc of distributing pulverized coal is a parameter expressed by the following Expression [1]. In the following Expression [1], the term "Cr" represents a "providing amount of pulverized coal 8 for the redactor 21" and corresponds to a providing amount of carbon-containing material for the gasification stage of the present invention (hereinafter, also referred to as a "providing amount of pulverized coal to the redactor").

The term "Cc" represents a "providing amount of the pulverized coal 8 for the combustor 20" (hereinafter also referred to a "providing amount of pulverized coal to the combustor").

The term "Ct" is "the total amount of the providing amount Cr of pulverized coal to the redactor and the providing amount Cc of pulverized coal to the combustor, i.e., the total providing amount of pulverized coal provide to the gasifier 2", and corresponds to a "total providing amount of carbon-containing material to the gasifier" of the present invention (hereinafter, also referred to the "total providing amount of pulverized coal").

In other words, the ratio Rc of distributing pulverized coal is a ratio of the providing amount Cr of pulverized coal to the redactor to the total providing amount Ct of pulverized coal.

$$Rc = Cr/Ct = Cr/(Cr+Cc) \quad [1]$$

Figure 2A:
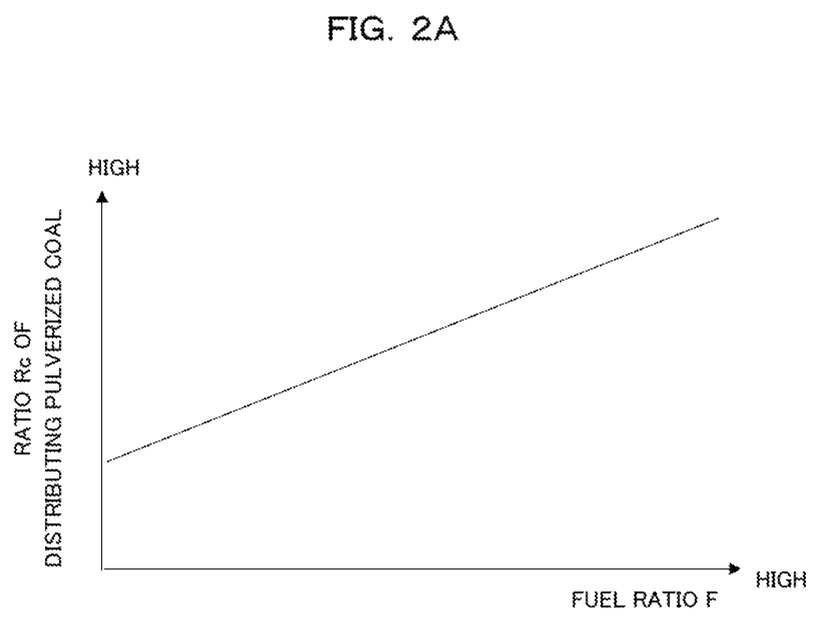

The ratio Rc of distributing pulverized coal is different with the coal property (the material property) and as shown in FIG. 2A for example, has an tendency to increase as the fuel ratio F increases. This means that the providing amount Cr of pulverized coal to the redactor increases as the fuel ratio F increases.

The ratio Rc of distributing pulverized coal stored in the controlling apparatus 7 can be corrected. The ratio Rc of distributing pulverized coal has been examined and set in the designing state of the IGCC system on the basis of the coal property obtained previously, but is appropriately corrected through trial operation (material distributing ratio setting step).

The providing amount of pulverized coal to each redactor pulverized-coal combustor burners 21A is the amount ($=Cr/Nr$) obtained by dividing the providing amount Cr of pulverized coal to the redactor by the burner number Nr, and the providing amount of pulverized coal to each pulverized-coal combustor burner 20A is the amount ($=Cc/Nc$) obtained by dividing the providing amount Cc of pulverized coal to the combustor by the burner number Nc of the pulverized-coal combustor burners 20A.

The controlling apparatus 7 includes an oxidizing-agent providing ratio setting section (oxidizing-agent distributing ratio setting means) 72 that sets the ratio Ro of distributing oxidizing agent. The controlling apparatus 7 controls the respective degrees of opening of the flow adjusting valves 19VA and 19VB to achieve the ratio Ro of distributing oxidizing agent. Namely, the flow adjusting valves 19VA and 19VB are configured to be an oxidizing-agent distributing ratio adjusting valve of the present invention.

The ratio Ro of distributing oxidizing agent is a parameter represented by following Expression [2]. In the following Expression [2], the term "Oc" represents a "providing amount of oxidizing agent for oxidizing the pulverized coal 8 for the combustor 20" and corresponds to a providing amount of oxidizing agent to oxidize the carbon-containing material for the combustion stage (hereinafter, also referred to "providing amount of oxidizing agent for pulverized coal").

The term "Och" represents a "providing amount of oxidizing agent to oxidize the char 12" (hereinafter referred to a providing amount of oxidizing agent for char".

The term "Ot" represents the total amount of the providing amount Oc of oxidizing agent for pulverized coal and the providing amount Och of oxidizing agent for the char 12, i.e., the total providing amount of oxidizing agent to the combustor 20, and corresponds to a "total providing amount of oxidizing agent to the combustion stage" of the present invention (hereinafter, referred to the "total providing amount of oxidizing agent").

In other words, the ratio Ro of distributing oxidizing agent is a ratio of the providing amount Oc of oxidizing agent for pulverized coal to the total providing amount of oxidizing agent to the combustor 20.

$$Ro = Oc/(Oc+Och) = Oc/Ot \quad [2]$$

The providing amount of oxidizing agent to each pulverized-coal combustor burner 20A is an amount ($=Oc/Nc$) obtained by dividing the providing amount Oc of oxidizing agent for pulverized coal by the burner number Nc, and the providing amount of oxidizing agent to each char burner 20B is an amount ($=Och/Nch$) obtained by dividing the providing amount Och of oxidizing agent for char by the burner number Nch of the char burner 20B.

Figure 2B:
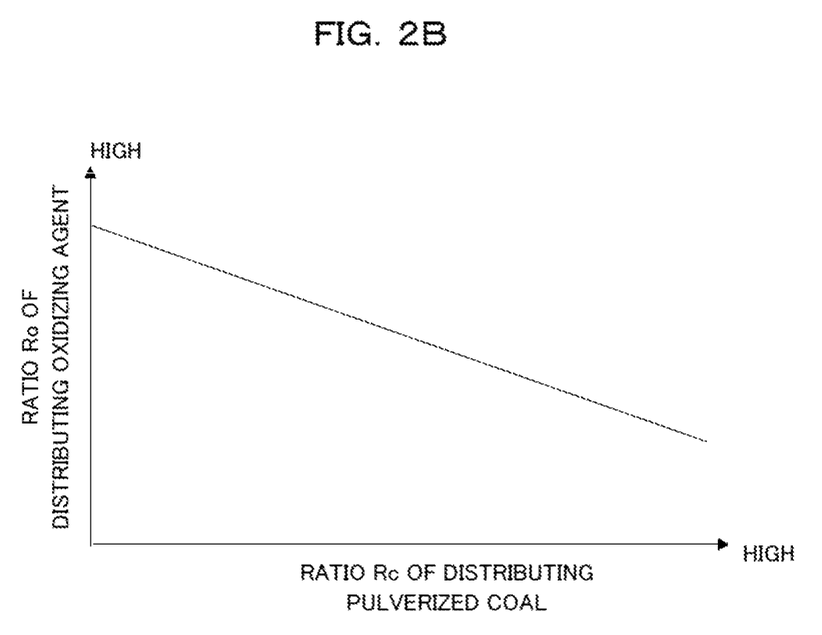

The oxidizing-agent distributing ratio setting section 72 sets the ratio Ro of distributing oxidizing agent to decrease as the ratio Rc of distributing pulverized coal increases by referring to the setting map shown in FIG. 2B being previously stored in the controlling apparatus 7, for example.

Since the redactor 21 is not provided with the oxidizing agent 9c, the redactor 21 more easily generates the char 12 containing unburned carbon as one of the principal components as compared with the combustor 20. For this reason, as the ratio Rc of distributing pulverized coal increases, a generated amount of the char 12 increases and a required amount of the oxidizing agent 9c to oxidize the char 12 increases. At the same time, as the ratio Rc of distributing pulverized coal increases, the providing amount Cc of pulverized coal to combustor decreases. As a solution to the above, the ratio Ro of distributing oxidizing agent is lowered as the ratio Rc of distributing pulverized coal increase so that the providing amount Oc of oxidizing agent for pulverized coal is reduced and the providing amount Och of oxidizing agent for char is in turn increased.

In contrast, as the ratio Rc of distributing pulverized coal decreases, the generated amount of the char 12 is reduced and also the providing amount Cc of pulverized coal to the combustor increases. To deal with this, the ratio Ro of distributing the oxidizing agent is increased to lower the providing amount Och of oxidizing agent for char, and the providing amount Oc of oxidizing agent for pulverized coal is in turn increased.

In the setting map shown in FIG. 2B, the air ratio of each pulverized-coal combustor burner 20A is set such that the blaze of the pulverized-coal combustor burner 20A is stably maintained regardless of the largeness of the ratio Rc of distributing pulverized coal. Here, the "the air ratio of each pulverized-coal combustor burner 20A" is a "ratio of the providing amount of oxygen to each pulverized-coal combustor burner 20A" to "a theoretical amount of oxygen required to completely combust the pulverized coal provided to the pulverized-coal combustor burner 20A".

[1-3. Action and Effects]

According to the first embodiment of the present invention, the ratio Rc of distributing pulverized coal is set on the basis of the coal property (in this embodiment, the fuel ratio F) of the coal 8' in the design and trial operation stages (material distributing ratio setting step). The oxidizing-agent distributing ratio setting section 72 of the controlling apparatus 7 sets the ratio Ro for distributing oxidizing agent according to the ratio Rc of distributing pulverized coal (oxidizing agent distributing ration setting step). The total providing amount Ot of oxidizing agent is determined, depending on the property of the coal 8' and the load on the coal gasification system 100. Therefore, as clearly understood from the above Expression [2], once the ratio Ro of distributing oxidizing agent is set, the providing amount Oc (setting value) of oxidizing agent for pulverized coal to the combustor 20 and the providing amount (setting value) of oxidizing agent to the pulverized-coal combustor burner 20A are determined on the basis of the total providing amount Ot of oxidizing agent and the ratio Ro of distributing oxidizing agent.

Accordingly, the air ratio of the pulverized-coal combustor burner 20A can be set such that the blaze of the pulverized-coal combustor burner 20A is stably maintained regardless of the largeness of the property of the coal 8' (in the present embodiment, the fuel ratio F).

Consequently, the range of the kind of applicable coal can be enlarged.

2. Second Embodiment

[2-1. Configuration of Principal Part]

Description will now be made in relation to the principal part of the coal gasification system (carbon-containing material gasification system) 100A according to the second embodiment with reference to FIGS. 3 and 4. Like reference numbers designate similar or substantially similar elements between the first and second embodiment, so repetitious description is omitted here.

Figure 3:
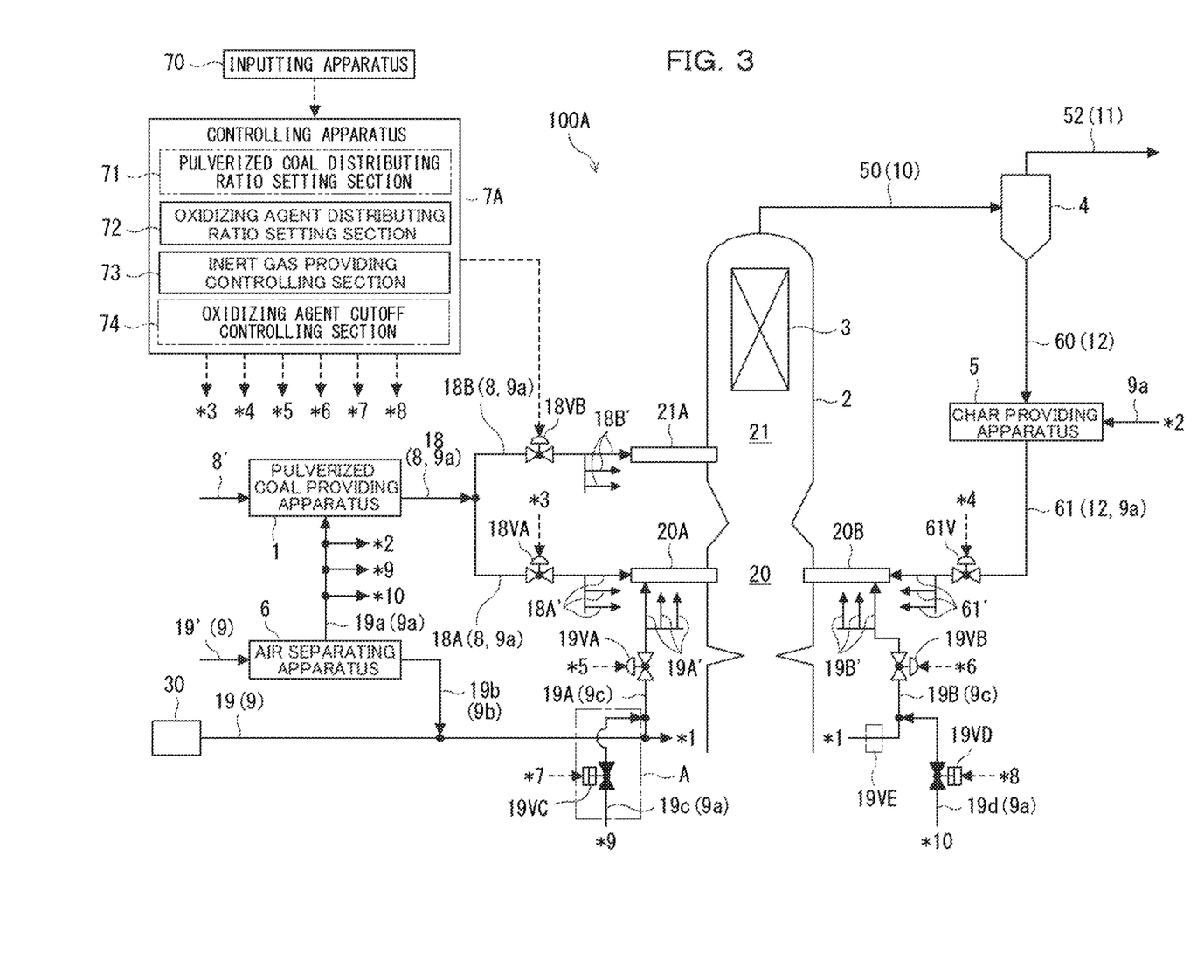
FIG. 3 is a schematic diagram illustrating the configuration of a coal gasification system (carbon-containing material gasification system) according to a second embodiment of the present invention.
Figure 4:
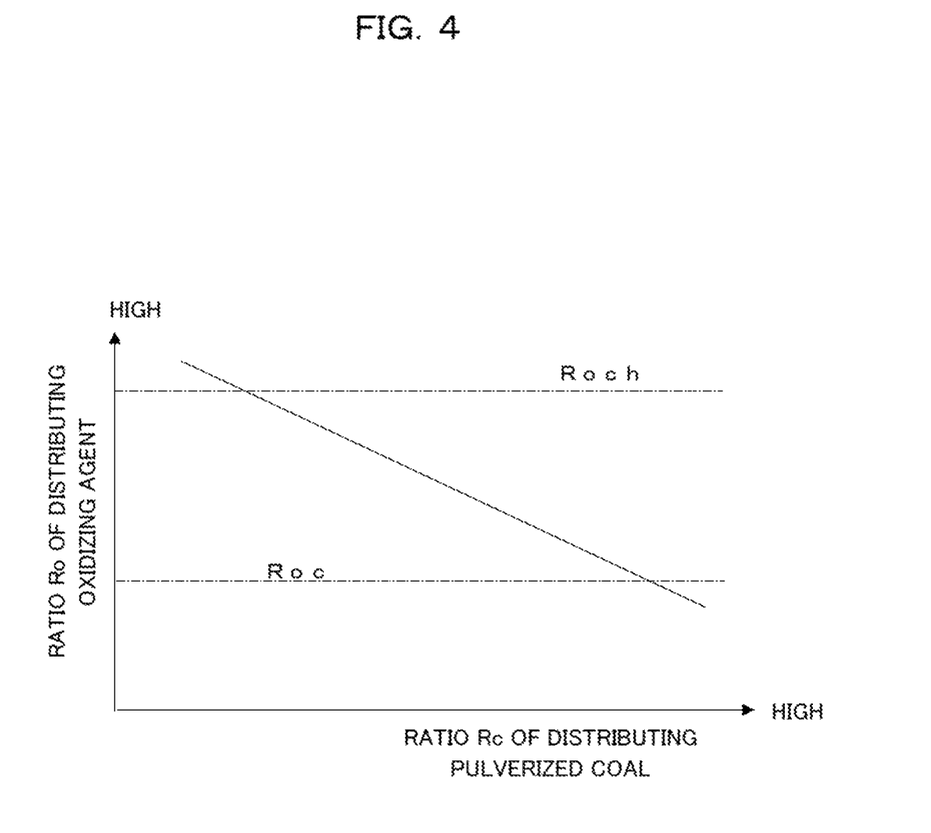
FIG. 4 is a schematic diagram showing a setting map of the second embodiment and explaining a condition for opening and closing a cutoff valve interposed in an inert gas providing pipe.

As illustrated in FIG. 3, in the coal gasification system 100A of the present embodiment, an inert gas providing pipe 19c is coupled to the oxidizing agent providing pipe 19A that provides an oxidizing agent 9c to pulverized-coal combustor burner 20A at the upstream side from the flow adjusting valve 19VA along the flow direction of the oxidizing agent 9c. The inert gas providing pipe 19c is branched from the inert gas providing pipe 19a coupled to the air separating apparatus 6 and a cutoff valve 19VC is interposed in the inert gas providing pipe 19c.

This configuration makes it possible to provide the inert gas 9a to the pulverized-coal combustor burner 20A. Namely, the inert gas providing means of the present invention is configured by including the inert gas providing pipe 19c and the cutoff valve 19VC.

Likewise, an inert gas providing pipe 19d is coupled to the oxidizing agent providing pipe 19B that provides the oxidizing agent 9c to the char burner 20B at an upstream side of the flow adjusting valve 19VB along the flow direction of the oxidizing agent 9c. The inert gas providing pipe 19d is branched from the inert gas providing pipe 19a coupled to the air separating apparatus 6, and a cutoff valve 19VD is interposed in the inert gas providing pipe 19d.

This configuration makes it possible to provide the inert gas 9a to the char burner 20B. Namely, the inert gas providing means of the present invention is configured by including the inert gas providing pipe 19d and the cutoff valve 19VD.

The controlling apparatus 7A includes an inert-gas providing controlling section (inert-gas providing controlling means) 73 in addition to the oxidizing-agent distributing ratio setting section 72.

The inert-gas providing controlling section 73 obtains the ratio Ro of distributing oxidizing agent for pulverized coal from the oxidizing-agent distributing ratio setting section 72, and controls opening-closing of the cutoff valves 19VC and 19VD in accordance with the ratio Ro of distributing oxidizing agent (here, FIG. 3 illustrates the state where both the cutoff valves 19VC and 19VD are closed).

Further specific description will now be made with reference to FIG. 4. If the ratio Ro of distributing the oxidizing agent exceeds the predetermined value Roc (Ro>Roc), which means that the providing amount Oc of oxidizing agent for pulverized coal exceeds a first threshold corresponding to the predetermined value Roc, the inert-gas providing controlling section 73 makes the cutoff valve 19VC into the closed state. On the other hand, if the ratio Ro of distributing oxidizing agent is equal to or less than the predetermined value Roc (Ro≤Roc), which means that the providing amount Oc of oxidizing agent for pulverized coal is equal to or less than the first threshold, the inert-gas providing controlling section 73 makes the cutoff valve 19VC into the opened state.

Furthermore, if the ratio Ro of distributing oxidizing agent is less than a predetermined value Roch (Ro<Roch), which means that the providing amount Och of oxidizing agent for char exceeds a second threshold corresponding to the predetermined value Roch, the inert-gas providing controlling section 73 makes the cutoff valve 19VD into the closed state. On the other hand, if the ratio Ro of distributing oxidizing agent is equal to or more than the predetermined value Roch (Ro≥Roch), which means that the providing amount Och of oxidizing agent for char is less than second threshold, the inert-gas providing controlling section 73 makes the cutoff valve 19VD into the opened state.

The remaining configuration is the same as that of the coal gasification system 100 of the first embodiment, so repetitious description is omitted here.

[2-2. Action and Effects]

With the above configuration of the coal gasification system 100A of the second embodiment, if the providing amount Cc of pulverized coal to the combustor reduces and the providing amount Oc of oxidizing agent for pulverized coal comes to be equal to or less than the first threshold as a result that the ratio Rc of distributing pulverized coal is set to be relatively high in accordance with the coal property (in this embodiment, the fuel ratio F of coal), the cutoff valve 19VC is opened to provide the inert gas 9a to the pulverized-coal combustor burner 20A (hereinbefore, first inert gas providing step). On the other hand, if the providing amount of char to the combustor 20 reduces and the providing amount Och of oxidizing agent for char comes to be equal to or less than the second threshold as a result of the ratio Rc of distributing pulverized coal is set to be relatively low in accordance with the coal property, the cutoff valve 19VD is opened to provide the inert gas 9a to the char burner 20B through the flow adjusting valve 19VB (hereinbefore, second inert gas providing step).

Consequently, even when the providing amount Oc of oxidizing agent for pulverized coal reduces to lower the providing amount of the oxidizing agent 9c to each pulverized-coal combustor burner 20A below the control range of each flow adjusting valve 19VA, the inert gas 9a is provided to the oxidizing agent 9c and thereby the flow amount of the oxidizing agent 9c containing the inert gas 9a to be provided to each pulverized-coal combustor burner 20A (i.e., the sum of the flow amount of the oxidizing agent 9c and the flow amount of the inert gas 9a) can be made in a control range of each flow adjusting valves 19VA. Accordingly, the providing amount of oxygen to each pulverized-coal combustor burner 20A and consequently the providing amount of oxygen for pulverized coal to the combustor 20 can be made into appropriate values by controlling the degree of opening of the flow adjusting valve 19VA, considering the oxygen concentration of the oxidizing agent 9c containing the inert gas 9a.

In contrast, even if the providing amount Och of oxidizing agent for char decreases and consequently the providing amount of the oxidizing agent 9c to each char burner 20B lowers below the control range of each of the flow adjusting valve 19VB, providing the inert gas 9a to the oxidizing agent 9c makes the flow amount of the oxidizing agent 9c containing the inert gas 9a to the char burner 20B to be within the control range of each of the flow adjusting valve 19VB. Accordingly, controlling the degree of opening of the flow adjusting valve 19VB considering the oxygen concentration of the oxidizing agent 9c containing the inert gas 9a makes the providing amount of oxygen to each char burner 20B and consequently the providing amount of the oxygen for char to be respective appropriate value.

Furthermore, keeping the flow amount of the oxidizing agent 9c containing the inert gas 9a to be provided to the burners 20A and 20B through the flow adjusting values 19VA and 19VB to be equal to or more than a predetermined value can maintain the flow rate V of the burners 20A and 20B to be a predetermined flow rate or more.

Here, each of the burners 20A and 20B has a double-cylinder structure having an inner cylinder and an outer cylinder. The pulverized coal 8 or the char (containing the inert gas 9a functioning as the carrier air) flows inside the inner cylinder, and the oxidizing agent 9c containing the inert gas 9a flows between the inner cylinder and the outer cylinder. Here, a burner flow rate V particularly represents the flow rate of the oxidizing agent 9c containing the inert gas 9a flowing between the inner cylinder and the outer cylinder. The respective jetting directions of the burners 20A and 20B are set to be the direction substantially along the circumference direction of the gasifier 2 and the jetting from the burners 20A and 20B generates swirling flow in the gasifier. The swirling flow stirs and mixes the pulverized coal 8 and the oxidizing agent 9c in the gasifier, and thereby the generated gas 10 can be efficiently generated. In the present embodiment, mixing the oxidizing agent 9c and the inert gas 9a as described above allows the burner flow rate V to be kept at a predetermined velocity or more, so that swirling flow having a flow velocity of a predetermined velocity or more can be obtained (in other words, swirling power of a predetermined value or more can be obtained).

Consequently, the coal gasification system 100A of the second embodiment of the present invention properly sets a providing amount of oxygen to the pulverized coal and a providing amount of oxygen to char in the combustor 20 regardless of the fuel property of the coal (i.e., regardless of the largeness of the ratio Rc of distributing pulverized coal). Concurrently, since the swirling force in the the gasifier 2 is maintained to be a predetermined value or more, the generated gas 10 can be efficiently generated.

[2-3. Modification]

(1) If the coal 8' is high-ash coal, the most components of the char 12 is ash and does not contribute to generation of the high-temperature gas since the ash does not burn even when being provided to the char burners 20B. For the above, if the coal 8' is high-ash coal, the requirement for providing the oxidizing agent 9c to the char burners 20B is low and the char burners 20B are expected to merely apply swirling force to the inside of the gasifier 2. Consequently, if the coal 8' is high-ash coal, a preferable operation is that the char burners 20B is mainly provided with the inert gas 9a, providing with oxidizing agent 9c as low in amount as possible, and in contrast, the pulverized-coal combustor burners 20A are mainly provided with the oxidizing agent 9c, providing with the inert gas 9a as low in amount as possible, to efficiently generate the high-speed gas.

If it is known, by referring to the coal property obtained beforehand in the designing stage of the IGCC system 100A that the ash content of the coal 8' exceeds a predetermined threshold (predetermined content) previously stored (i.e., if it is already known that the coal 8' is a high-ash coal), the inert-gas providing controlling section 73 may carry out the following control (hereinafter, referred to as "control for high-ash coal"), not obeying to the setting map of FIG. 4.

In other words, the cutoff valves 19VD may be opened to provide the inert gas 9a to the char burners 20B, and the cutoff valve 19VC may be half-opened (if the inert gas 9a is not provided, the cutoff valve 19VC may be completely closed) so that the providing amount of inert gas 9a to the pulverized-coal combustor burners 20A further decreases than the case where the ash content of the coal 8' is equal to or lower than a predetermined threshold (including a case where the inert gas 9 is not provided). The above threshold to determine whether the coal 8' is high-ash coal is not limited to the above, and is exemplified by 15 wt % or more of ash content (based on the wet coal).

Such control on high-ash coal also can apply swirling force to the inside of the gasifier 2 by the inert gas 9a jet from the char burners 20B, and can also efficiently generate high-temperature gas through providing only the pulverized coal 8 and the oxidizing agent 9c (or the pulverized coal 8, the oxidizing agent 9c, and the inert gas 9a less in amount than a case where the coal 8' is not high-as coal) from the pulverized-coal combustor burner 20A Accordingly, the gasifier 2 efficiently generates the generated gas 10.

Alternatively, the inputting apparatus (ash content inputting means) 70 may input the ash content of the coal 8' into the controlling apparatus 7A and, if the input ash content exceeds the above threshold, the control on high-ash coal may be executed.

(2) Furthermore, as illustrated by the two-dotted broken lines in FIG. 3, a cutoff valve (cutoff means) 19VE may be disposed in the oxidizing agent providing pipe 19B at an upstream side of the flow adjusting valve 19VB and the connection between the oxidizing agent providing pipe 19B and the inert gas providing pipe 19d, and also the controlling apparatus 7A may be provided with an oxidizing-agent cutoff controlling section (oxidizing-agent cutoff controlling means) 74. If the ash content of the coal 8' stored beforehand in the controlling apparatus 7A (or the ash content of the coal 8' input into the controlling apparatus 7A from the inputting apparatus 70) exceeds the predetermined threshold, the oxidizing-agent cutoff controlling section 74 may close the cutoff valve 19VE to stop the proving of the oxidizing agent 9c to the char burners 20B.

If the ash content of the coal 8' is high, this configuration stops the providing of the oxidizing agent 9c to the char burner 20B which does not contribute to generation of the generated gas 10 very much, and advantageously can save unnecessary consumption of the oxidizing agent 9c. Since stopping the providing of the oxidizing agent 9c to the char burners 20B in turn increases a providing amount of the oxidizing agent 9c to the pulverized-coal combustor burners 20A, the gasifier 2 can further efficiently generate the generated gas 10.

(3) In place of inputting the ash content of the coal 8' from the inputting means 70, an operator may determine whether the ash content of the coal 8' exceeds the predetermined threshold and, if the ash content exceeds the predetermined threshold, may operate an inputting switch that closes the cutoff valve 19VE.

(4) Furthermore, when it is decided that only high-ash coal is to be used as the coal 8' in the coal gasification system 100A beforehand, the region A of FIG. 3 surrounded by the one-dotted lines and representing an inert gas providing system including, for example, the inert gas providing pipe 19c and the cutoff valve 19VC may be omitted because the coal gasification system 100A is preferably operated by providing a relatively large amount of the inert gas 9a to the char burners 20B and providing the oxidizing agent 9c but not providing the inert gas 9a to the pulverized-coal combustor burners 20A as described above.

3. Miscellaneous (1) In the foregoing embodiments, the ratio Rc of distributing pulverized coal is set in the design stage and the trial operation stage. Alternatively, as shown by the two-dotted lines in FIGS. 1 and 3, the controlling apparatus 7, 7A may be provided with a pulverized-coal distributing ratio setting section (material distributing ratio setting means) 71. The inputting apparatus (material property inputting means) 70 inputs the coal property (e.g., the fuel ratio) of the coal 8' into the controlling apparatus 7, 7A and the pulverized-coal distributing ratio setting section 71 sets the ratio Rc of distributing pulverized coal by referring to the setting map shown in FIG. 2A previously stored in accordance with the coal property (material distributing ratio setting step).

(2) In the foregoing embodiments, the present invention is applied to a gasifier of an integrated coal gasification combined cycle system, but application of the present invention is not limited to a gasifier of an integrated coal gasification combined cycle system. Alternatively, the present invention may be applied to gasifiers of various chemical plants such as a fertilizer manufacturing plant.

(3) The foregoing embodiments use pulverized coal as the carbon-containing material, but the carbon-containing material is not limited to pulverized coal (coal). Alternatively, biomass or petroleum coke may be used as the carbon-containing material.

(4) The foregoing embodiments apply the present invention to a gasifier of an air-blown integrated coal gasification combined cycle system, but may alternatively be applied to a gasifier of an oxygen-blown integrated coal gasification combined cycle system.

DESCRIPTION OF REFERENCE SIGNS 1 pulverized coal providing apparatus
2 gasifier
5 char providing apparatus
6 air separating apparatus
7, 7A controlling apparatus
8' coal
8 pulverized coal (carbon-containing material)
9a inert gas (nitrogen)
9b oxygen
9c oxygen-rich air (oxidizing agent)
10,11 generated gas
12 char
18, 18A, 18B pulverized coal providing pipe
18A', 18B' pulverized coal distributing pipe
18VA, 18VB flow adjusting valve (material distributing ratio adjusting valve)
19VA, 19VB flow adjusting valve (oxidizing-agent distributing ratio adjusting valve)
19, 19', 19A, 19B oxidizing agent providing pipe
19A' oxidizing agent distributing pipe (material oxidizing-agent providing line)
19B' oxidizing agent distributing pipe (char oxidizing-agent providing line)
19VC, 19VD cutoff valve
19VE cutoff valve (cutoff means)
19a, 19c, 19d inert gas providing pipe
19b oxygen providing pipe
20 combustor (combustion stage)
20A combustor burner for pulverized coal, pulverized-coal combustion burner
20B combustor burner for char, char burner
21 redactor (gasification stage)
21A redactor pulverized-coal burner
60 char pipe
61 char providing pipe
61' char distributing pipe
61V flow adjusting valve
70 inputting apparatus (material property inputting means, ash content inputting means)
71 pulverized-coal distributing ratio setting section (material distributing ratio setting means)
78 oxidizing-agent distributing ratio setting section (oxidizing-agent distributing ratio setting means)
73 inert-gas providing controlling section (inert-gas providing controlling means)
74 oxidizing-agent cutoff controlling section (oxidizing-agent cutoff controlling means)
100,100A coal gasification system (carbon-containing material gasification system)
Cr providing amount of pulverized coal to the redactor (providing amount of carbon-containing material for the gasification stage)
Cc providing amount of pulverized coal to the combustor
Ct total providing amount of pulverized coal (total providing amount of carbon-containing material to the gasifier)
Oc providing amount of oxidizing agent for pulverized coal (providing amount of oxidizing agent for carbon-containing material)
Och providing amount of oxidizing agent for char
Ot total providing amount of oxidizing agent (total providing amount of oxidizing agent to the combustion stage)
Rc ratio of distributing pulverized coal (material distribution ratio)
Ro ratio of distributing oxidizing agent

The invention claimed is:

1. A method for setting a ratio of distributing oxidizing agent in a carbon-containing material gasification system comprising: a gasifier that comprises a combustion stage and a gasification stage; generates high-temperature gas from the combustion stage by providing an inside of the gasifier with an oxidizing agent, a char, and a carbon-containing material for the combustion stage; and causes the high-temperature gas to thermal decompose and gasify a carbon-containing material for the gasification stage to generate generated gas from the gasification stage by providing the inside of the gasifier with the carbon-containing material for the gasification stage; and char providing means that separates the char from the generated gas, and provides the combustion stage with the char, the combustion stage comprising carbon-containing material combustion means and char combustion means, provides the carbon-containing material for combustion stage along with an oxidizing agent for the carbon-containing material for the combustion stage from the carbon-containing material combustion means, and provides the char along with an oxidizing agent for the char from the char combustion means the method comprising:

a material distributing ratio setting step for setting a ratio of distributing material defined by an Expression [3];

an oxidizing agent distributing ratio setting step for setting the ratio of distributing oxidizing agent defined by an Expression [4] to be smaller as the ratio of distributing material increases;

(ratio of distributing material)=(providing amount of the carbon-containing material for the gasification stage)/(total providing amount of the carbon-containing material to the gasifier) [3]

(ratio of distributing oxidizing agent)=(providing amount of the oxidizing agent to oxidize the carbon-containing material for the combustion stage)/(total providing amount of the oxidizing agent to the combustion stage) [4]; and a first inert gas providing step for providing, when a providing amount of the oxidizing agent for the carbon-containing material for the combustion stage is equal to or less than a first threshold, an inert gas to a material oxidizing-agent providing line that provides the oxidizing agent for the carbon-containing material for the combustion stage to the carbon-containing material combustion means.

2. The method for setting a ratio for distributing an oxidizing agent according to claim 1, further comprising a second inert gas providing step for providing, when a providing amount of oxidizing agent for the char is equal to or less than a second threshold, an inert gas to a char oxidizing-agent providing line that provides the oxidizing agent for the char to the char combustion means.

3. The method for setting a ratio for distributing an oxidizing agent according to claim 2, further comprising, when an ash content of the carbon-containing material exceeds a predetermined content, decreasing a providing amount of the inert gas to the carbon-containing material combustion means further than a case where the ash content is equal to or lower than the predetermined content; and providing the inert gas to the char combustion means.

4. The method for setting a ratio for distributing an oxidizing agent according to claim 3, further comprising:

when the ash content exceeds the predetermined content, stopping the providing of the oxidizing agent to the char combustion means.

* * * * *